United States Patent [19]
Akridge et al.

[11] Patent Number: 5,141,614
[45] Date of Patent: Aug. 25, 1992

[54] SPUTTERING PROCESS FOR PREPARING VITREOUS COMPOSITIONS BASED ON $Li_3PO_4$ AND $LiPO_3$ AS NETWORK FORMERS AND NETWORK MODIFIERS

[75] Inventors: James R. Akridge, Middleburg Heights; Steven D. Jones, North Ridgeville, both of Ohio

[73] Assignee: Eveready Battery Company, Inc., St. Louis, Mo.

[21] Appl. No.: 771,383

[22] Filed: Sep. 30, 1991

Related U.S. Application Data

[62] Division of Ser. No. 584,553, Sep. 9, 1990, Pat. No. 5,085,953.

[51] Int. Cl.⁵ .............................................. C23C 14/34
[52] U.S. Cl. ................................................. 204/192.15
[58] Field of Search .................... 204/192.15; 429/193; 501/45

[56] References Cited

FOREIGN PATENT DOCUMENTS 59-191267 10/1984 Japan .............................. 204/192.15

Primary Examiner—Aaron Weisstuch
Attorney, Agent, or Firm—Robert W. Welsh

[57] ABSTRACT

Vitreous solid compositions are prepared via an RF sputtering process in an inert gas atmosphere from a target composition comprised of either $Li_3PO_4$ or $LiPO_3$ as a network former or network modifier.

10 Claims, 1 Drawing Sheet

SPUTTERING PROCESS FOR PREPARING VITREOUS COMPOSITIONS BASED ON Li₃PO₄ AND LiPO₃ AS NETWORK FORMERS AND NETWORK MODIFIERS

This is a divisional of copending application Ser. No. 07/584,553 filed on Sep. 9, 1990, now U.S. Pat. No. 5,085,953.

This invention relates to vitreous compositions and their use as solid state electrolytes.

Compositions which are solid at room temperature, are electrically insulative and ionically conductive can be used as solid state electrolytes. These electrolytes are desirable in cells in which a liquid electrolyte is disadvantageous. Examples of such cells are miniature cells which are stored for extended periods and where liquid electrolytes are difficult to handle. Another example is in the manufacture of solid state microbatteries.

Although the solid state electrolytes exhibit lower specific conductivities than the liquid electrolytes, the solid state electrolytes can be used in devices and circuits which operate on low currents.

Examples of solid state electrolytes are metallic salts and vitreous solid compositions. Examples of metallic salt solid electrolytes include compounds that conform to the formula: AgI-MCN-AgCN, wherein M is potassium, ribidium, cesium or mixtures thereof.

Vitreous solid compositions, or glasses, are generally comprised of a network former, a network modifier and a network dopant. A network former provides a macromolecular network of irregular structure. A network modifier is an ionic compound which becomes incorporated into the macromolecular network of the network former. A network dopant provides mobile cations to the network. Typically these glass precursors, in powder form, are added together, heated sufficiently to fuse them together and then cooled to form the vitreous solid. An example of a vitreous solid composition employing a phosphorus oxide-sulfide network former corresponds to the formula:

$$P_4O_aS_b \cdot cLi_2S \cdot dLi_2O \cdot eX$$

wherein
X is a dopant selected from the group consisting of LiBr, LiCl, LiF, LiI, Li₂CO₃, Li₂SO₄, Li₂SiO₃ and Li₄SiO₄;
a is equal to (10−b) with b being greater than 0 and less than 10 with the proviso however that when b is 6, a can be 3;
c and d are from 0 to about 4 with the proviso that when c and d are both greater than 0 then d=4−c, and when c or d is 0 then d or c, respectively, is greater than 0; and
e is from 0 to about 7.

The network former is selected from P₄O₉S, P₄O₈S₂, P₄O₇S₃, P₄O₆S₄, P₄O₅S₅, P₄O₄S₆, P₄O₃S₆, P₄O₃S₇, P₄O₂S₈ and P₄OS₉, and is formed by mixing and heating P₂O₅ with P₂S₅. The network modifier is selected from Li₂S and Li₂O.

Although these electrolytes exhibit desirable conductivities, the vitreous solid is difficult to prepare from the mentioned compounds because Li₂O and P₂O₅ are extremely hygroscopic. Therefore, the use of such compounds is inhibited.

It would be desirable to have new vitreous solid compositions that could be prepared with easy to handle raw materials, and that would exhibit acceptable specific conductivities.

SUMMARY OF THE INVENTION

This invention is a vitreous solid composition at 25° C., comprising Li₃PO₄ or LiPO₃ as a network former and/or network modifier.

In another aspect, this invention is a vitreous solid composition at 25° C. which comprises the vitreous product formed under glass-forming conditions from phosphorus sulfide and either Li₃PO₄ or LiPO₃ as a network former, Li₂S as an optional network modifier, and a network dopant selected from the group consisting of LiI, LiBr, LiCl, and LiF.

In yet another aspect, this invention is a mixture that corresponds to the formula:

$$xLi_2S \cdot yP_2S_5 \cdot (1-x-y)A \cdot zLiX$$

wherein:
A is either Li₃PO₄ or LiPO₃;
X is a halide, i.e. I, Br, Cl, or F;
x is a real number greater than or equal to 0 and less than or equal to 0.68;
y is a real number greater than or equal to 0.15 and less than or equal to 0.33;
x+y is a real number greater than 0 and less than 1; and
z is a real number greater than or equal to 0.55 and less than or equal to 1.2.

In still yet another aspect, this invention is a vitreous solid composition at 25° C. formed under glass-forming conditions from the above-mentioned precursor mixture.

In still yet another aspect, this invention is an electrochemical cell employing an active anode material, an active cathode material and the above-mentioned vitreous solid compositions as a solid state electrolyte.

In another aspect, this invention is a process for preparing a vitreous solid film by sputtering a target composition comprised of the above-mentioned precursor mixture.

In still yet another aspect, this invention is a microbattery that is less than 100 microns thick. The microbattery is comprised of a sputtered metal film contact supported on a substrate, a sputtered film cathode layer in contact with the metal film contact, a sputtered film of the above mentioned vitreous solid composition over the cathode and contact, and a vapor deposited anode layer deposited over the electrolyte layer and a separate metal film contact.

Also, this invention is a process for preparing vitreous solid compositions. The process comprises heating a mixture of powders of a network former, network modifier and network dopant to temperatures sufficient to fuse the mixture. The mixture is then cooled to 25° C. Either lithium metaphosphate or lithium orthophosphate is used as a network former and/or network modifier.

Further, this invention is a vitreous composition corresponding to the formula:

$$xLi_2S \cdot yP_2S_5 \cdot (1-x-y)Li_3PO_4 \cdot zLiX;$$

wherein:
X is a halide;
x is a real number greater than or equal to zero and less than or equal to 0.68;

y is a real number greater than or equal to 0.15 and less than or equal to 0.33;

z is a real number greater than or equal to 0.55 and less than or equal to 1.2; and wherein, either:

y is less than $0.2x + 0.2$, or z is greater than $1.75(1 - x + y)$.

In another aspect, this invention is a vitreous composition corresponding to the formula:

$$xLi_2S, yP_2S_5, (1-x-y)LiPO_3, zLiX;$$

wherein:

X is a halide;

x is a real number greater than or equal to 0 and less than or equal to 0.68;

y is a real number greater than or equal to 0.15 and less than or equal to 1.2; and wherein, either:

y is less than $x - 0.33$, or z is greater than $1.75(1 - x + y)$.

Employing lithium orthophosphate, $Li_3PO_4$, and lithium metaphosphate, $LiPO_3$, as sources of the network formers, and optional network modifier, in the vitreous solid compositions of this invention avoids the disadvantages of using $P_2O_5$ as the network former and $Li_2O$ as the network modifier encountered in previous compositions. Further, the $Li_3PO_4$ and $LiPO_3$ can be employed as both the network former and network modifier, and can provide the sole source of oxygen to the network. The compositions have specific conductivities that enable them to be used as electrolytes.

BRIEF DESCRIPTION OF THE DRAWING

The Drawing shows a cross section of a micro-battery employing an electrolyte comprised of the vitreous composition made from either $Li_3PO_4$ or $LiPO_3$ as a network former and/or network modifier.

DETAILED DESCRIPTION OF THE INVENTION

Figure 1:
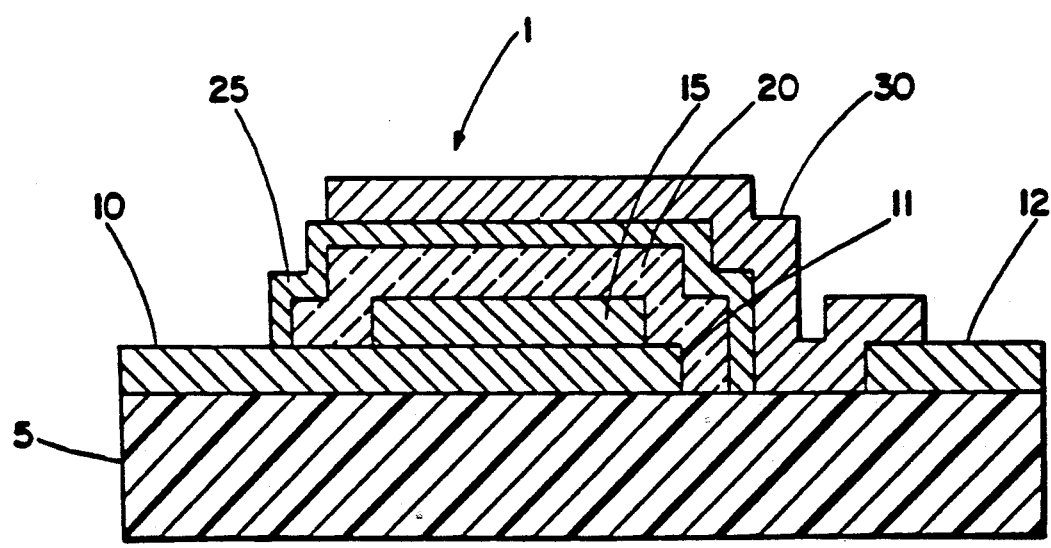

A vitreous solid composition is one which is a glassy non-crystalline solid. The compositions of this invention are vitreous solids at 25° C.

Lithium orthophosphate, $Li_3PO_4$, or lithium metaphosphate, $LiPO_3$, are used as a network former and/or a network modifier. They can be used as both the network former and network modifier, or with other formers and modifiers. These compounds provide oxygen to the glass network. Preferably, they are the sole source of oxygen. Phosphorus sulfide can be used as an additional network former. The amount of $Li_3PO_4$ and $LiPO_3$ employed can vary according to the amount of phosphorus sulfide and additional network modifier employed.

Lithium orthophosphate is readily prepared by the reaction of $H_3PO_4$ and LiOH and is readily commercially available.

Lithium metaphosphate is readily prepared by the reaction of $HPO_3$ and LiOH and is readily commercially available.

Phosphorus sulfide, $P_2S_5$, is prepared by the reaction of phosphorus and sulfur and is readily commercially available.

Lithium sulfide, $Li_2S$, can be used as an additional network modifier along with the lithium orthophosphate and lithium metaphosphate. Lithium sulfide is readily commercially available. Other modifiers can be employed as well, such as lithium oxide, but lithium sulfide is preferred. The amount of lithium sulfide employed can vary according to the amount of phosphorus sulfide and lithium orthophosphate and lithium metaphosphate employed.

The network dopants employed in this invention are lithium halides, i.e. lithium iodide, LiI; lithium bromide, LiBr; lithium chloride, LiCl; and lithium fluoride, LiF. The dopants are employed in an amount effective to enhance the conductivity of the composition.

The vitreous solid compositions of this invention are prepared under glass-forming conditions. Such conditions are those methods known for preparing glasses or vitreous compositions. One such conventional method is by fusing the precursors. For example, the compositions can be prepared by mixing the network former, network modifier and network dopant precursors, in powder form, and then heating the powder mixture at a temperature sufficient to melt the mixture to form a fused composition. This fused composition is then cooled to yield the glass or vitreous composition. Specifically, the precursors can be blended in an inert atmosphere box whose atmosphere is preferably dry, for example, one that contains less than 10 ppm of water. The mixture can be pelletized and inserted into a tube that can withstand the fusion temperatures and that is open at one end. The open end is stopped and the tube containing the pelletized glass precursors is removed from the inert atmosphere box. The tube is evacuated and the open end is sealed by melting and collapsing it in a flame. The evacuated sealed tube is then heated to a temperature sufficient to fuse the mixture. Generally, above 950° C. is sufficient. The mixture is heated at this temperature for 15 minutes, and then the temperature is lowered somewhat, to about 750° C., and then maintained for 15 minutes. The tube containing the molten solid electrolyte is then quenched in cold water to about 25° C. The silica tube containing the glassy solid electrolyte is then returned to the inert atmosphere box, broken and the solid electrolyte is recovered and ready for use in an electrochemical cell. These bulk vitreous compositions can exhibit specific conductivities of greater than about $0.75 \times 10^{-4}$ S/cm$^2$.

In another method, the vitreous composition can be made in a sputtering process. In this process, a target is prepared from a compressed mixture of the powdered precursors. The target is then placed in a vacuum chamber, and ionized gas, such as argon, is used to sputter a film of the vitreous composition from the target. These sputtered film vitreous compositions can exhibit specific conductivities of greater than about $1 \times 10^{-6}$ S/cm$^2$.

The vitreous solid compositions of this invention are formed from a precursor mixture that corresponds to the formula:

$$xLi_2S, yP_2S_5, (1-x-y)A, zLiX$$

wherein:

A is either $Li_3PO_4$ or $LiPO_3$;

X is a halide, i.e., I, Br, Cl or F;

x is a real number greater than or equal to 0 and less than or equal to 0.68;

y is a real number greater than or equal to 0.15 and less than or equal to 0.33;

x + y is a real number greater than 0, and less than 1; and z is a real number greater than or equal to 0.55 and less than or equal to 1.2.

Preferred vitreous solid compositions of this invention are formed from precursor mixtures that correspond to the formulae:

| | |
|---|---|
| 0.66 Li$_2$S, 0.26 P$_2$S$_5$, 0.08 Li$_3$PO$_4$, 0.57 LiX; | a |
| 0.61 Li$_2$S, 0.31 P$_2$S$_5$, 0.08 Li$_3$PO$_4$, 0.62 LiX; | b |
| 0.67 Li$_2$S, 0.28 P$_2$S$_5$, 0.05 Li$_3$PO$_4$, 0.65 LiX; | c |
| 0.14 Li$_2$S, 0.23 P$_2$S$_5$, 0.63 Li$_3$PO$_4$, 0.96 LiX; | d |
| 0.25 Li$_2$S, 0.25 P$_2$S$_5$, 0.50 Li$_3$PO$_4$, 1.0 LiX; | e |
| 0 Li$_2$S, 0.20 P$_2$S$_5$, 0.8 Li$_3$PO$_4$, 1.2 LiX; | f |
| 0.61 Li$_2$S, 0.31 P$_2$S$_5$, 0.08 LiPO$_3$, 0.62 LiX; | g |
| 0.57 Li$_2$S, 0.29 P$_2$S$_5$, 0.14 LiPO$_3$, 0.57 LiX; | h |
| 0.65 Li$_2$S, 0.31 P$_2$S$_5$, 0.04 LiPO$_3$, 0.58 LiX; | i |
| 0.50 Li$_2$S, 0.17 P$_2$S$_5$, 0.33 LiPO$_3$, 0.58 LiX; | j | wherein X is a halide, and preferably is either I or Br.

Other preferred compositions can correspond to the following formulae. Although these formulae will be described relative to the amounts of the precursors used, it shall be understood that the formulae apply to the resulting glass or vitreous composition itself, regardless of the types and amounts of precursors used. For lithium orthophosphate, Li$_3$PO$_4$, the compositions correspond to the formula:

$$xLi_2S, yP_2S_5, (1-x-y)Li_3PO_4, zLiX;$$

wherein
X is a halide;
x is a real number greater than or equal to 0 and less than or equal to 0.68;
y is a real number greater than or equal to 0.15 and less than or equal to 0.33;
z is a real number greater than or equal to 0.55, and less than or equal to 1.2; and wherein, either:
y is less than 0.2X+0.2, or
z is greater than 1.75(1−x+y).

For lithium metaphosphate, LiPO$_3$, the compositions correspond to the formula:

$$xLi_2S, yP_2S_5, (1-x-y)LiPO_3, zLiX;$$

wherein
X is a halide;
x is a real number greater than or equal to 0 and less than or equal to 0.68;
y is a real number greater than or equal to 0.15 and less than or equal to 0.33;
z is a real number greater than or equal to 0.55 and less than or equal to 1.2, and, wherein, either:
y is less than x−0.33, or
z is greater than 1.75(1−x+y).

The vitreous compositions of this invention are useful as electrolytes in electrochemical cells. The cells are comprised of an active anode material, an active cathode material and the electrolyte.

Suitable active anode materials include lithium, silver, sodium, potassium and rubidium. The materials can be used as alloys or pure metals. The anodes can be in foil or powder form. The preferred anode is lithium metal and lithium alloys.

Suitable active cathode materials include TiS$_2$, FeS$_2$, Sb$_2$S$_3$, MoS$_3$, TiS$_2$+MoS$_3$, organic charge transfer complexes with halogens, and MnO$_2$. Preferably, TiS$_2$ is employed as the active cathode material. TiS$_2$ can be prepared by reacting a titanium sponge with finely divided sulfur. It is also commercially available, for example, from Degussa A. G., Frankfurt, W. Germany.

For electrochemical cells that employ the vitreous composition in bulk form, the cathode comprises the active cathode material, a conductive agent and some of the vitreous composition to be employed as the electrolyte. Suitable conductive agents include carbon, graphite, and metal powders such as nickel. For microbatteries, preferably the cathode is a sputtered film comprised solely of the active material.

One preferred type of microbattery that employs the vitreous solid compositions as electrolytes uses a TiS$_2$ cathode and a lithium metal anode. These microbatteries are less than 100 microns, and preferably less than 75 microns thick. To prepare these microbatteries, a metallic contact is attached to a substrate by sputtering a film of the metal. The substrate can be any electrically insulative solid support substance, such as a glass, plastic or resin. Any metal that is conductive and can be sputtered can be employed. Preferred examples include platinum and chromium. A film of the TiS$_2$ is sputtered onto the metallic contact. Next, a layer of the vitreous solid composition is deposited to cover both the TiS$_2$ film and a portion of the chromium contact. The vitreous composition is prepared by forming a target comprised of a compressed mixture of the powdered precursors, i.e. network former, network modifier and dopant, and then depositing a layer of the vitreous composition through a mask using a RF magnetron sputtering source. Preferably over this electrolyte layer is deposited a protective layer. This protective layer protects the lithium anode from reacting with the electrolyte. Any material that is relatively unreactive toward the electrolyte and lithium and that is ionically conductive can be employed. A preferred example is LiI, or other network dopant material. The lithium metal anode layer can then be deposited over the protective layer using vapor deposition techniques. Preferably, the microbattery is constructed in a dry room since the components are reactive to moisture. Advantageously, less than 5 ppm water is present. Preferably, the microbattery is encapsulated in a suitable encapsulant to isolate the microbattery from the atmosphere. Examples of suitable encapsulants include electrically insulative resins. A preferred encapsulant is FC-721, a fluoropolymer available from 3M Corp.

The Drawing depicts a preferred microbattery 1. The microbattery 1 comprises a substrate 5 to which is attached chromium contacts 10 and 12. TiS$_2$ cathode 15 is in contact with chromium contact 10. Vitreous solid electrolyte 20 covers TiS$_2$ cathode 15 completely and edge 11 of chromium contact 10. Protective layer 25 of LiI completely covers vitreous solid electrolyte 20. Li anode layer 30 partially covers protective layer 25 and is in contact with chromium contact 12 to complete microbattery 1.

Preferred vitreous solid electrolytes for use in a microbattery have a low sulfur content. One preferred electrolyte composition is formed from a precursor mixture that corresponds to the formula:

$$0\ Li_2S, 0.20\ P_2S_5, 0.80\ Li_3PO_4, 1.2\ LiI.$$

In other cases, it can be preferred that the electrolyte be completely free of sulfur. The microbatteries can exhibit an open circuit voltage of 2.5 V and show a discharge efficiency of about 90% to a 1.8 V cutoff at a current density of at least 8 microamps/cm$^2$. Thus, these batteries can be used in micro-devices, such as memory back up in computer chips, and in sensors such as dissolved oxygen sensors that are used in the medical, biological and environmental industries.

The following examples illustrate the invention, but do not limit its scope.

EXAMPLE 1

A vitreous composition is prepared using 0.66 mole of $Li_2S$ as a network modifier, 0.26 mole $P_2S_5$ and 0.08 mole $Li_3PO_4$ as network formers, and 0.57 mole LiI as a network dopant. The components are in powder form, are mixed and sealed under vacuum in a fused silica tube. This mixture is heated at 950° C. for fifteen minutes followed by 15 minutes heating at 750° C. A fused composition results that is then cooled by rapid quenching to 25° C. to provide the vitreous composition. The composition has a specific conductivity of $5.9 \times 10^{-4}$ S/cm at 25° C., and an activation energy of 0.29 eV.

EXAMPLE 2

A vitreous composition is prepared using the same precursors and according to the method described in Example 1, except that 0.57 mole of LiBr is employed as the network dopant rather than LiI. This composition has a conductivity of $2.4 \times 10^{-4}$ S/cm at 25° C. and an activation energy of 0.36 eV.

EXAMPLE 3

A vitreous composition is prepared using 0.61 mole of $Li_2S$ as a network modifier, 0.31 mole of $P_2S_5$ and 0.08 mole of $Li_3PO_4$ as network formers, and 0.62 mole of LiI as a network dopant. The components are in powder form, are mixed and sealed under vacuum in a fused silica tube. This mixture is heated at 950° C. for 15 minutes followed by heating at 750° C. for 15 minutes. This fused mixture is rapidly quenched to 25° C. A vitreous composition results that has a conductivity of $5.6 \times 10^{-4}$ S/cm at 25° C. and an activation energy of 0.29 eV.

EXAMPLE 4

A vitreous composition is prepared using 0.61 mole $Li_2S$ as a network modifier, 0.31 mole of $P_2S_5$ and 0.08 mole $LiPO_3$ as network formers, and 0.62 mole of LiI as a network dopant. The composition is made according to the method described in Example 3, and the resulting composition has a conductivity of $3.3 \times 10^{-4}$ S/cm at 25° C. and an activation energy of 0.34 eV.

EXAMPLE 5

A vitreous composition is prepared according to the method described in Example 3 using 0.57 mole of $Li_2S$ as a network modifier, 0.29 mole $P_2S_5$ and 0.14 mole $LiPO_3$ as network formers, and 0.57 mole of LiI as a network dopant. The composition has a conductivity of $2.3 \times 10^{-4}$ S/cm at 25° C. and an activation energy of 0.34 eV.

EXAMPLE 6

An electrochemical cell is prepared using a lithium foil anode, $TiS_2$ as the active cathode material and the vitreous composition of Example 1 as the electrolyte. The cell size has an outside diameter of 0.787 in. and a height of 0.061 inch. The cathode mix is prepared by mixing about 0.17 gm of $TiS_2$ with about 0.11 gm of the vitreous composition of Example 1. The cathode has a diameter of about 0.63 inch and a discharge capacity of about 40 mAh. About 0.1 gm of the vitreous composition is employed as an electrolyte disc, and has a diameter of about 0.64 inch. Several cells are discharged at 10K ohm, 15K ohm and 30K ohm to a cutoff voltage of 1.4 volts. The average performance at 10K ohm is 11.1 mAh discharge capacity, representing an efficiency of 27.3% of theoretical input. The midlife discharge voltage (MLV) is 1.97 volts. At 15K ohm, the average performance is 17.2 mAh discharge capacity, representing an efficiency of 43%. The MLV is 1.94 volts. At 30K ohm, the average performance is 34.4 mAh discharge capacity representing an efficiency of 85%. The MLV is 2.0 volts.

EXAMPLE 7

Electrochemical cells are prepared using the electrolyte and cathode mix of Example 6 and a Li powder anode rather than a Li foil anode. Several cells are discharged at 7.5K ohm to a cutoff voltage of 1.4 volts. The average performance is 28.3 mAh discharge capacity representing an efficiency of 70.7% of theoretical input. The MLV is 1.94 volts.

EXAMPLE 8

Electrochemical cells are prepared employing a Li foil anode, $TiS_2$ active cathode material and the composition of Example 2 as the electrolyte. The cathode is a mixture of about 0.17 gm of $TiS_2$ and about 0.11 gms of the composition of Example 2. The cell size is the same as used in Example 6. The cathode has a diameter of about 0.64 inch and a capacity of about 40 mAh. About 0.09 gm of the composition of Example 2 is used as the electrolyte. The electrolyte disc has a diameter of about 0.64 inch. Several cells are discharged at 10K ohm, 15K ohm and 30K ohm to a cutoff voltage of 1.4 volts. At 10K ohm, the average performance of the cells is 6.2 mAh discharge capacity, representing an efficiency of 15.5% of theoretical input. The MLV is 2.0 volts. At 15K ohm, the average performance is 10.5 mAh discharge capacity representing an efficiency of 26.2%. The MLV is 1.96 volts. At 30K ohm, the average performance is 25.6 mAh discharge capacity representing an efficiency of 64%. The MLV is 1.94 volts.

EXAMPLE 9

Electrochemical cells are prepared employing the cathode mix and electrolyte as in Example 8. The anode is Li powder. The cells are discharged at 15K ohm to a cutoff voltage of 1.4 volts. The average performance is 27.3 mAh discharge capacity representing an efficiency of 69%. The MLV is 1.96 volts.

EXAMPLE 10

Electrochemical cells are prepared using a Li foil anode, $TiS_2$ active cathode material and the composition of Example 4 as the electrolyte. The cathode mix is about 0.16 gm of $TiS_2$ and about 0.14 gm of the electrolyte composition of Example 4. The cathode has a diameter of about 0.63 inch and a capacity of about 40 mAh. About 0.1 gm of the composition of Example 4 is used as the solid electrolyte disc and it has a diameter of about 0.64 inch. The cells are discharged at 30K ohm to a cutoff voltage of 1.4 volts. and the average performance is 33.6 mAh discharge capacity representing an efficiency of 84%. The MLV is 2.05 volts.

EXAMPLE 11

Electrochemical cells are prepared employing a Li foil anode, $TiS_2$ active cathode material and the composition of Example 5 as the electrolyte. A cathode mix is prepared from about 0.18 gm of $TiS_2$ and about 0.12 gm of the electrolyte composition of Example 5. The cathode has a diameter of about 0.63 inch and a capacity of about 44 mAh. About 0.11 gm of the composition of Example 5 is employed as the solid electrolyte. The electrolyte disc has a diameter of about 0.64 inch. The cells are discharged at 30K ohm to a cutoff voltage of 1.4 volts. The average performance of the three cells tested is 27 mAh discharge capacity representing an efficiency of 61% of theoretical input. The MLV is 1.87 volts.

EXAMPLE 12

A microbattery is prepared by depositing the various layers through appropriate masks. The sputtered layers are deposited using an MRC 903 Sputtering System. The microbatteries are constructed under a dry, inert atmosphere (under Ar atmosphere) of below 5 ppm of water. First, a chromium layer is deposited by sputtering from a chromium target onto a substrate through a mask using a DC magnetron sputtering source. A $TiS_2$ target is sputtered through a mask onto the chromium layer and substrate using a RF magnetron sputtering source. The density of the $TiS_2$ sputtered film is 1.47 $g/cm^3$. The vitreous electrolyte composition is prepared by forming a target of a compressed mixture of 0.20 mole $P_2S_5$, 0.8 mole $Li_3PO_4$ and 1.2 mole LiI. The $Li_3PO_4$ is used as both a network former and network modifier. A layer of vitreous solid electrolyte is deposited on the $TiS_2$ cathode film by sputtering the target using a RF magnetron sputtering source. A film of LiI is vacuum evaporated onto and completely covering the layer of electrolyte. This film forms a protective layer. Finally, a lithium metal anode layer is vacuum evaporated over a portion of the LiI layer and onto a separate chromium contact. The lithium anode is between 1 and 2 microns thick. The total battery thickness is about 10 microns. It has an open circuit voltage of 2.5 V and exhibits greater than 90% discharge efficiency to a 1.8 V cutoff for over 5 hours when discharged at 8 microamps/$cm^2$. The internal resistance of the battery is about 750 ohms as measured by complex impedance spectroscopy.

The battery is attached to a dissolved oxygen sensor. The sensor consists of a silk screened gold working electrode surrounded by a chlorided silk screened silver electrode to make a silver/silver chloride counter electrode. A MAX 663 voltage regulator chip from Maxim Integrated Products is used in combination with the battery to supply and regulate the correct voltage to the sensor electrode. The sensor draws 7-8 microamps from the battery and displays a linear response to oxygen concentration in a solution ranging from 1 to 14 ppm.

What is claimed is:

1. A process for preparing a vitreous solid film comprising RF sputtering, in an inert gas atmosphere, a target composition comprising either $Li_3PO_4$ or $LiPO_3$ as the sole source of oxygen and as a network former or network modifier.

2. The process of claim 1, wherein the target composition further comprises $Li_2S$ as a network modifier for the vitreous solid.

3. The process of claim 2, wherein the target composition further comprises $P_2S_5$ as a network former for the vitreous solid.

4. The process of claim 3, wherein the target composition further comprises a network dopant for the vitreous solid.

5. The process of claim 4, wherein the network dopant is selected from the group consisting of LiCl, LiBr, LiI, and LiF.

6. The process of claim 1, wherein the target composition further comprises $P_2S_5$ as a network former for the vitreous solid.

7. The process of claim 6, wherein the target composition further comprises a network dopant for the vitreous solid.

8. The process of claim 7, wherein the network dopant is selected from the group consisting of LiCl, LiBr, LiI, and LiF.

9. The process of claim 1, wherein the target composition further comprises a network dopant for the vitreous solid.

10. The process of claim 9, wherein the network dopant is selected from the group consisting of LiCl, LiBr, LiI, and LiF.

* * * * *